Patented May 11, 1954

2,678,260

UNITED STATES PATENT OFFICE 2,678,260

METHOD FOR DETECTING CYANIDE

Melvin M. Falkof, United States Army, and Benjamin Witten and Bernard Gehauf, Baltimore, Md., assignors to the United States of America as represented by the Secretary of War No Drawing. Application February 8, 1945, Serial No. 576,870

4 Claims. (Cl. 23—230)

(Granted under Title 35, U. S. Code (1952), sec. 266)

The invention described herein may be manufactured and used by or for the Government, for governmental purposes, without the payment to us of any royalty thereon.

This invention relates to a device and method for detection and quantitative determination of cyanides and cyanogen chloride.

An object of this invention is to provide a specific, direct and simple device and method suitable for use in the field by inexpert personnel, as well as suitable for use under other circumstances. In this inventioin a new test for cyanides and cyanogen chloride has been developed that offers distinct advantages in sensitivity and specificity over the conventional methods now in use.

In principle the test depends upon the ability of a cyanogen halide, such as cyanogen chloride or bromide, to split the pyridine ring to form a derivative of glutaconic aldehyde, which in turn is made to couple with a suitable coupling agent, such as a derivative of pyrazolone, to form highly colored compounds. The previous use of this type of reaction with cyanogen chloride was confined to the coupling of the split pyridine ring with aromatic amines whereby coloring matters were formed that did not have the stability or intensity of those formed from the pyrazolone derivatives.

In a practical example, a solution containing pyridine or one of its derivatives and a suitable pyrazolone derivative, such as 1-phenyl-3-methyl-5,pyrazolone, is exposed on a white or transparent carrier, such as paper, or silica gel or in a gas absorption bubbler to air suspected of containing cyanogen chloride. The appearance of a magenta coloration changing to deep blue indicates the presence of the cyanogen agent.

To test for hydrogen cyanide or alkali cyanides, it is necessary to convert them first to a cyanogen halide, such as cyanogen chloride, and to then apply the test as above. Typical methods are as follows:

*Test of cyanides in solution.*—Buffer the solution to be tested with sodium carbonate, add a drop of a 5% solution of chloramine T or other water soluble chloramine to chlorinate cyanide or other cyanogen compound if it be present in the solution and follow with a drop of the pyridine-pyrazolone reagent. The appearance of a pink coloration changing to blue indicates the presence of a cyanide. The depth of coloration is proportional to the amount of cyanide present. Thiocyanates give the same test; ferro or ferricyanide and cyanates do not give the test.

*Test for hydrogen cyanide in air.*—Pass suspected air through an absorbent solution or through a tube containing white, activated silica gel, then treat with chloramine solution and follow with pyridine-pyrazolone reagent. Magenta colorations changing to blue indicate hydrogen cyanide. For a more direct test spot one end of a strip of filter paper with a chloramine solution and the other end with pyridine pyrazolone solution. Fold back paper so that both spots are in closed proximity. A blue color will appear on the pyridine pyrazolone spot if hydrogen cyanide is present.

I claim:

1. A method of detecting a cyanide of a group consisting of the alkali cyanides and hydrogen cyanide in a suspected solution wherein, if said cyanide be present, the solution first appears to be pink, then blue; said method consisting of buffering the solution with sodium carbonate, chlorinating the cyanide with a water soluble chloramine, and adding a liquid reagent consisting essentially of a sulphur-free organic compound containing a pyridine ring and 1-phenyl-3-methyl-5-pyrazolone.

2. A method of detecting an alkali cyanide in a suspected solution which, if the alkali cyanide be present, appears to be first pink, then blue when undergoing the test; said method consisting of buffering the solution with sodium carbonate, chlorinating the cyanide with a water soluble chloramine, and thereafter adding to said solution a reagent consisting essentially of a sulphur-free organic compound containing a pyridine ring and 1-phenyl-3-methyl-5-pyrazolone.

3. A method of detecting an alkali cyanide in a suspected solution which, if an alkali cyanide be present, appears to be pink, then blue, when undergoing the test; said method consisting of buffering the solution with sodium carbonate, chlorinating the cyanide with a solution of chloramine T containing not less than 5% of said chloramine, and thereafter adding to said solution a reagent consisting essentially of a sulphur-free organic compound containing a pyridine ring and 1-phenyl-3-methyl-5-pyrazolone.

4. A method of detecting a hydrogen cyanide in a suspected solution, which, if a hydrogen cyanide be present, appears to be pink, then blue, when undergoing the test; said method consisting of buffering the solution with sodium carbonate, chlorinating the cyanide with a chloramine T solution containing not less than 5% of said chloramine, and thereafter adding a reagent consisting essentially of a sulphur-free organic compound containing a pyridine ring and 1-phenyl-3-methyl-5-pyrazolone.

References Cited in the file of this patent

UNITED STATES PATENTS

| Number | Name | Date |
| --- | --- | --- |
| 1,843,376 | Stusser | Feb. 2, 1932 |

OTHER REFERENCES

Ripan, Univ. Cluj. Bul. Soc. Stiinte Cluj., vol. 4, pp. 144–153 (1928). Abstracted in Chem. Abstracts, vol. 23, page 2905 (1929).